United States Patent Office 2,834,805
Patented May 13, 1958

---

2,834,805

PROCESS FOR PRODUCING MONOSODIUM GLUTAMATE CRYSTALS

Joseph L. Purvis, Northbrook, and Bruno Vassel, Deerfield, Ill., assignors to International Minerals & Chemical Corporation, a corporation of New York No Drawing. Application June 2, 1955
Serial No. 512,874

8 Claims. (Cl. 260—534)

This invention relates to a process for the production of monosodium glutamate crystals, and more particularly, to a process for the production of an improved type of monosodium glutamate crystal.

Monosodium glutamate, particularly monosodium glutamate prepared from glutamic acid recovered from sugar beet residues, is conventionally crystallized in the form of long needle-like crystals in which the longest axis is of the order of 10 to 15 times the length of the shortest axis of the crystal. This form of monosodium glutamate is useful for many applications, for example, it may be sprinkled on foods or mixed in liquid soups or dissolved in water for spraying fowl, or the like. However, for certain other applications, the long needle-like form of monosodium glutamate is unsuitable. For example, when long needle-like crystals of monosodium glutamate are admixed with powdered soups, which are frequently granulated mixtures, and the admixture of soup and monosodium glutamate crystals shipped or otherwise handled, the monosodium glutamate crystals tend to separate from the soup granules due to the difference in crystal form. The homogeneous appearance of the admixture is lost upon the separation of the monosodium glutamate crystals and the effect sought by the addition of the monosodium glutamate is likewise lost because of lack of uniformity of the admixture. Similarly, in certain other commercial applications of monosodium glutamate, for example, in spice mixes containing monosodium glutamate, there is a tendency for the spices to separate from the monosodium glutamate crystals when the latter are in the form of long needle-like crystals. When a mixture of monosodium glutamate and spice in which such separation has occurred is added in increments to a food stuff, it is apparent that certain increments will contain very little monosodium glutamate whereas other increments will contain a substantial proportion of monosodium glutamate, thus resulting in a non-uniform seasoning of the foodstuff. There has been a need for a simple means for producing monosodium glutamate crystals in the form of short, stout crystals, so that the monosodium glutamate crystals would be sufficiently similar to the particles of powdered foodstuffs and spice mixes, and the like, so that the monosodium glutamate crystals would not have the tendency to become separated from the granules of the foodstuff upon handling or transportation.

It is an object of this invention to provide a process for producing monosodium glutamate crystals having improved physical properties.

It is another object of the instant invention to produce monosodium glutamate crystals in which the longest axis is less than about 5 times the length of the shortest axis.

It is another object of the instant invention to produce short, stout crystals of monosodium glutamate by a process which is cheap and efficient and suitable for commercial adaptation.

It is another object of the instant invention to produce short, stout crystals of monosodium glutamate from glutamic acid recovered from sugar beet residues such as concentrated Steffen's filtrate, barium filtrate and vinasse.

In accordance with this invention, monosodium glutamate is produced in the form of crystals in which the longest axis is less than about 5 times the length of the shortest axis of the crystal by crystallizing monosodium glutamate from an aqueous solution containing the amino acid alanine while maintaining a relatively low rate of crystal growth. The solution of monosodium glutamate may be prepared by dissolving monosodium glutamate in water or by adjusting the hydrolyzate of a glutamic acid precursor compound to a suitable pH, that is, to a pH of between about 6 and about 8, and preferably to about pH 7. Desirably, the alanine should be present in the monosodium glutamate solution in an amount of at least about 0.1% alanine based upon the weight of monosodium glutamate in solution. Preferably, the alanine will be present in the solution in an amount between about 0.2% and about 0.4% alanine based upon the weight of the monosodium glutamate in solution. More than about 0.4% alanine may be utilized, but there is little advantage in doing so.

According to one embodiment of this invention, a monosodium glutamate solution having a pH of between about 6 and about 8, preferably a pH of about 7 and containing at least about 0.2% alanine, preferably about 0.3% alanine, is treated to crystallize the monosodium glutamate from the solution under conditions conducive to a relatively low rate of crystal growth. By the phrase "relatively low rate of crystal growth" is meant a rate of crystal growth at least as low as that which occurs when a supersaturated solution containing about 50% by weight of monosodium glutamate in water at room temperature is allowed to undergo spontaneous crystallization (without evaporation, seeding, etc.) by standing without agitation at room temperature.

Those skilled in the art of crystallization are well aware of the various means for maintaining a relatively low rate of crystal growth under varying conditions. For example, the degree of supersaturation of the monosodium glutamate solution is an important factor. As the degree of supersaturation of the solution is increased, the faster will be the rate of crystal growth, other factors remaining constant. The lowest rates of crystal growth are obtained at the lowest supersaturation concentrations under these conditions. Similarly the rate of monosodium glutamate crystal growth is increased by evaporating liquid from the solution during crystallization, other factors remaining constant or by cooling the monosodium glutamate solution during the crystallization process, or by crystallizing at an elevated temperature. On the other hand, the addition to a crystallizer of a subtantial quantity of seed crystals tends to slow down the rate of crystal growth and similarly an increase in the amount of analine present in the solution also retards monosodium glutamate crystal growth. Any one or more of these conditions may be varied to provide the "relatively low rate of crystal growth" required in accordance with this invention.

In commercial operations when it is desirable to crystallize monosodium glutamate at super-atmospheric temperature, for example at between about 40° C. and about 60° C., with simultaneous evaporation of the monosodium glutamate solution, the rate of crystal growth can be maintained at a relatively low rate by adding to the crystallizer a substantial quantity of seed crystals, for example, up to about 20% or more seed monosodium glutamate crystals based on the weight of monosodium glutamate in solution.

In operating the process of this invention at any given temperature without evaporation or seeding, the monosodium glutamate solution may be supersaturated to the extent of up to about 15%. By the term "15% supersaturated" monosodium glutamate solution is meant a water solution of monosodium glutamate containing 15% more dissolved monosodium glutamate than a saturated solution of monosodium glutamate contains at the same temperature. For example, if at a given temperature a saturated aqueous solution of monosodium glutamate contains 40% monosodium glutamate based on the weight of solution, then a 15% supersaturated monosodium glutamate solution at the same temperature contains 46% monosodium glutamate based on the weight of solution.

At room temperature an aqueous solution of monosodium glutamate containing between about 45% and about 50% monosodium glutamate based on the weight of solution may be utilized for an isothermal crystallization and preferably the solution will contain about 47% monosodium glutamate. For isothermal crystallization at higher temperatures, the concentration of monosodium glutamate will be higher in proportion to the increased solubility of monosodium glutamate.

Any convenient source of glutamic acid or monosodium glutamate or alanine may be utilized as the starting material for the process of this invention. The invention is equally applicable to L-, D-, and DL-glutamic acid and the corresponding monosodium glutamate. From an economy standpoint the most practical raw material is wheat gluten, Steffen's filtrate, barium filtrate or vinasse. Barium filtrate is liquor remaining following precipitation of sugar from beet sugar juice as barium saccharate; vinasse is the residual liquor which remains following fermentation of beet sugar residue and distillation of the resulting alcohol therefrom. In the case of the proteinaceous raw materials, acid hydrolysis is utilized, but with Steffen's filtrate, barium filtrate or vinasse, either acid or alkaline hydrolysis may be employed to recover the glutamic acid values therefrom.

It is not necessary that the monosodium glutamate solution prepared be free of other amino acids or other impurities in order to produce the short, stout crystal form of monosodium glutamate of this invention so long as a correspondingly less pure monosodium glutamate can be tolerated.

The alanine employed may be pure alanine recovered from any convenient source and may be L-alanine, D-alanine or DL-alanine. From the standpoint of economy, however, it is preferred to use alanine in the form of a hydrolyzate of a proteinaceous material such as gelatin, corn gluten, etc., which contain substantial quantities of alanine. It is not necessary to separate the alanine from the protein hydrolyzate since the latter need simply be added directly in sufficient quantity to supply the needed amount of alanine. Preferably glutamic acid is first separated from the protein hydrolyzate and the mother liquor remaining following removal of the glutamic acid is added in an amount to furnish the necessary alanine.

The following examples illustrate specific embodiments of this invention. All parts and percentages are by weight unless otherwise indicated.

*Example I*

Monosodium glutamate derived from natural sources in the amount of 50 parts and in the form of long needle-like crystals in which the longest axis was between about 10 and about 15 times the length of the shortest axis of the crystals and 0.15 parts of L-alanine were dissolved in about 55 parts of water at 80° C. with agitation. After the monosodium glutamate was completely dissolved, the solution was allowed to cool to 28° C. (room temperature). No monosodium glutamate separated during the cooling period. The cooled solution was then allowed to stand at about 28° C. without disturbing for one week. The monosodium glutamate crystals which separated during this time were short, stout crystals in which the longest axis was on an average of about 1.5 times the length of the shortest axis.

The above procedure was followed with the exception that alanine was not added to the solution. The monosodium glutamate crystals produced were long needle-like crystals in which the longest axis was on an average between about 10 times and about 15 times the length of the shortest axis.

*Example II*

The procedure of Example I was followed with the exception that in place of the alanine there were added to the solution 1.25 parts of a decolorized mother liquor containing 0.15 parts alanine and obtained by hydrolyzing corn gluten with hydrochloric acid and crystallizing glutamic acid from the hydrolyzate. The crystals of monosodium glutamate obtained by this procedure were short, stout crystals in which the longest axis was about equal to the shortest axis.

*Example III*

The procedure of Example I was followed with the exception that DL-alanine was substituted for L-alanine. The monosodium glutamate crystals produced were short, stout crystals in which the longest axis was about 2 times the length of the shortest axis.

*Example IV*

Glutamic acid in the amount of about 261 parts obtained by hydrolyzing concentrated Steffen's filtrate and separating glutamic acid at its isoelectric point was slurried in about 400 parts $H_2O$ and sufficient sodium hydroxide added to dissolve the glutamic acid and raise the pH of the solution to about 7. The temperature of the solution was raised to about 50° C. and one part L-alanine was dissolved therein. This solution was agitated moderately while maintaining the temperature constant at 50° C. The vessel containing the solution was not covered. After about 6 hours at 50° C. water, in amount of 50 grams had evaporated and about one part of fine monosodium glutamate crystals, was added as seed crystals. The seeded solution was agitated moderately for about 12 more hours at 50° C., during which time the total weight of the crystallizer mixture diminished to about 500 parts. The monosodium glutamate crystals which separated were removed by filtration and were found to be short, stout crystals in which the longest axis was about equal in length to the shortest axis.

The above procedure was followed with the exception that L-alanine was not added to the solution. The monosodium glutamate crystals recovered were conventional long needle-like crystals in which the longest axis was between about 10 times and about 15 times the length of the shortest axis.

*Example V*

The procedure of Example IV was carried out with the exception that DL-alanine was substituted for L-alanine. The monosodium glutamate crystals recovered were short, stout crystals in which the longest axis was about equal in length to the shortest axis.

We claim:

1. In a process for crystallizing monosodium glutamate from a supersaturated aqueous solution of monosodium glutamate which normally deposits long, needle-like crystals thereof, the improvement which comprises adding to said solution prior to said crystallization a small amount, at least about 0.1% by weight, of alanine based on the weight of monosodium glutamate in said solution, and maintaining a relatively low rate of crystal growth during said crystallization, said rate of crystal growth being at least as low as that which occurs when a super-saturated solution containing about 50% by weight of monosodium glutamate in water at room temperature is allowed to undergo spontaneous crystallization at room temperature without evaporation, seeding and agitation, whereby crystals of monosodium glutamate are obtained in which the longest axis is less than about 5 times the length of the shortest axis.

2. The process of claim 1 wherein between about 0.2 and about 0.4% by weight of alanine is added to said solution, based on the weight of monosodium glutamate therein.

3. The process of claim 1 wherein said solution contains less than about 50% by weight of monosodium glutamate.

4. The process of claim 1 wherein said solution is up to about 15% supersaturated with monosodium glutamate.

5. The process of claim 1 wherein said solution is between about 5 and about 10% supersaturated with monosodium glutamate.

6. The process of claim 1 wherein said crystallization is carried out at a temperature between about 40 and about 60° C.

7. In a process for producing monosodium glutamate from Steffen's filtrate wherein Steffen's filtrate is hydrolyzed, glutamic acid is separated from the hydrolyzate, the glutamic acid is dissolved in sufficient water in the presence of sufficient alkali to produce a supersaturated solution of monosodium glutamate having a pH between about 6 and about 8, and monosodium glutamate is crystallized therefrom, the improvement which comprises adding to said solution of monosodium glutamate prior to said crystallization a small amount, at least about 0.1% by weight, of alanine based on the weight of monosodium glutamate in said solution, and maintaining a relatively low rate of crystal growth during said crystallization, said rate of crystal growth being at least as low as that which occurs when a supersaturated solution containing about 50% by weight of monosodium glutamate in water at room temperature is allowed to undergo spontaneous crystallization at room temperature without evaporation, seeding, and agitation, whereby crystals of monosodium glutamate are obtained in which the longest axis is less than about 5 times the length of the shortest axis.

8. The process of claim 7 wherein the alanine is added to the monosodium glutamate solution in the form of a protein hydrolyzate.

References Cited in the file of this patent

UNITED STATES PATENTS 2,306,646     Shildneck _____ Dec. 29, 1942

OTHER REFERENCES

Schmidt: Chemistry of the Amino (1938), p. 613.

Tipson: Tech. of Org. Chem. (edited by A. Weissberger), vol. III (1950), pages 384–7.

Greenberg: Amino Acids and Proteins (1951), p. 218.